United States Patent
Meyer

(10) Patent No.: US 10,070,040 B2
(45) Date of Patent: Sep. 4, 2018

(54) METHOD FOR AUTOMATICALLY FOCUSING A CAMERA

(71) Applicant: Robert Bosch GmbH, Stuttgart (DE)

(72) Inventor: Michael Meyer, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 14/556,730

(22) Filed: Dec. 1, 2014

(65) Prior Publication Data

US 2015/0156401 A1 Jun. 4, 2015

(30) Foreign Application Priority Data

Dec. 3, 2013 (DE) .................. 10 2013 224 704

(51) Int. Cl.
| | |
|---|---|
| *H04N 5/232* | (2006.01) |
| *H04N 5/225* | (2006.01) |
| *H04N 5/238* | (2006.01) |
| *G02B 7/28* | (2006.01) |

(52) U.S. Cl.
CPC ..... *H04N 5/23212* (2013.01); *H04N 5/23219* (2013.01); *G02B 7/28* (2013.01)

(58) Field of Classification Search
CPC ................. H04N 5/23212; H04N 5/23219
USPC .... 348/208.3, 345, 352, 355, 356, 361, 363; 396/79–83, 89–152; 382/255
See application file for complete search history.

(56) References Cited

U.S. PATENT DOCUMENTS

| | | | |
|---|---|---|---|
| 6,301,440 B1 | 10/2001 | Bolle et al. | |
| 2003/0117516 A1 | 6/2003 | Ishida et al. | |
| 2007/0030381 A1 | 2/2007 | Maeda | |
| 2008/0170847 A1* | 7/2008 | Flannery | G03B 7/14 |
| | | | 396/222 |
| 2008/0240700 A1* | 10/2008 | Takagi | G03B 13/32 |
| | | | 396/98 |
| 2009/0009651 A1* | 1/2009 | Takayanagi | G03B 13/36 |
| | | | 348/345 |
| 2009/0015681 A1* | 1/2009 | Pipkorn | H04N 5/23219 |
| | | | 348/208.12 |
| 2009/0073304 A1* | 3/2009 | Kumagai | G03B 13/30 |
| | | | 348/345 |
| 2009/0268080 A1 | 10/2009 | Song et al. | |

(Continued)

FOREIGN PATENT DOCUMENTS

| | | |
|---|---|---|
| DE | 2361286 | 6/1975 |
| DE | 69207043 | 9/1996 |

(Continued)

*Primary Examiner* — Xi Wang
(74) *Attorney, Agent, or Firm* — Michael Best & Friedrich LLP

(57) ABSTRACT

A method for automatically focusing a camera (10), having an optical unit (11) for focusing and a driveable actuator unit (12) for adjusting the optical unit (11), on at least one object (20, 21), wherein an image is recorded by the camera, wherein the at least one object (20, 21) in the image is automatically detected by the camera (10) via image content analysis, wherein a distance (120, 121) between the at least one object (20, 21) and the camera (10) is automatically ascertained, and wherein the driveable actuator unit (12) is driven in a targeted manner based on the ascertained distance (120, 121) such that the optical unit (11) is focused on the at least one object (20, 21).

3 Claims, 1 Drawing Sheet

(56) References Cited

U.S. PATENT DOCUMENTS

| | | | | |
|---|---|---|---|---|
| 2010/0254690 A1* | 10/2010 | Sasaki | ................... | G02B 7/36 |
| | | | | 396/125 |
| 2011/0002680 A1* | 1/2011 | Narasimha | ............... | G03B 3/00 |
| | | | | 396/124 |
| 2012/0075492 A1* | 3/2012 | Nanu | ................. | H04N 5/23219 |
| | | | | 348/222.1 |
| 2012/0268608 A1* | 10/2012 | Watanabe | .......... | H04N 5/23219 |
| | | | | 348/169 |
| 2013/0235254 A1 | 9/2013 | Fillbrandt et al. | | |

FOREIGN PATENT DOCUMENTS

| | | |
|---|---|---|
| DE | 102010039431 | 2/2012 |
| EP | 0710927 | 5/1996 |

* cited by examiner

METHOD FOR AUTOMATICALLY FOCUSING A CAMERA

BACKGROUND OF THE INVENTION

The present invention relates to a method for automatically focusing a camera, in particular a video monitoring camera.

"Smart cameras" are understood to mean optical systems that not only record images but can also process them and/or interpret them themselves. In addition to having an image recording function, a smart camera, as an intelligent and autonomous optical system, can, for example, extract and process application-specific information from recorded images and make decisions based thereon.

Smart cameras, which are frequently used in the context of monitoring tasks, generally consist of a camera housing having a video processing unit (Video Content Analysis) and a removable lens. Depending on the application, different lenses (wide-angle lens, telephoto lens or zoom lens) can be used. After a new lens is mounted, it must generally be focused manually. Smart cameras are to this end typically connected to a computer (for example a notebook) via a network connection, for example via the Ethernet or WLAN. Subsequently, the camera image can be viewed on the notebook, while the lens is set to the best focus.

A further application is the use in what are known as autodome cameras, which have motors for panning, tilting and zooming (PanTiltZoom). In these cameras, the focus needs to be reset after each case of being directed to a new position.

A focusing device used in such smart cameras or a taking lens with variable focal length is disclosed, for example, in DE 23 61 286 A1. Automatic methods for motorized focusing of a lens (also referred to as autofocus methods) are known, for example, from DE 692 07 043 T2.

DE 10 2010 039 431 A1 discloses an apparatus for supporting manual focusing of a camera, in particular a smart camera.

For automatically focusing a camera, it is also possible to adjust the focus until the contrast measured within the image is as good as it can be. However, this sometimes takes a long time, since, as a result of iterative attempts, initially a setting in the wrong direction may be effected.

Therefore, there is a need for a method for automatically focusing corresponding cameras, in particular smart cameras in the monitoring field, which ensures quick focusing.

SUMMARY OF THE INVENTION

A method according to the invention for automatically focusing a camera, in particular a smart camera for video monitoring, is based on automatic distance ascertainment between an object and the camera. On the basis of the ascertained distance, any wrong or insufficient focusing can be corrected in a targeted manner in the right direction. Iterative and thus lengthy adjustment, as in the prior art, is not necessary.

The object of interest can be captured in the recorded image by image content analysis. The image content analysis can be based in particular on motion detection, i.e. moving objects are the objects of interest on which the camera focuses. To this end, for example an algorithm for intelligent video analysis, what is known as an IVA algorithm, can be used, as is disclosed, for example, in EP 0 710 927 A2.

A distance can advantageously likewise be ascertained by means of image analysis, for example by classifying an identified or captured object, i.e. assigning it to an object class having an associated object size. Exemplary object classes can be persons (approximately 1.75 m tall) and passenger vehicles (approximately 1.50). It is then easily possible to ascertain the distance from the then known parameters, image size of the object and object size.

Detection of whether an object moves toward the camera or away from it, which is also advantageous, ensures a quick tracking movement of an optical unit for focusing in the correct direction. It is not necessary to iteratively try out focus settings.

Preferably, a setting of a stop of the camera is also changed according to the distance of the object. Thereby, the focus can be set in an optimum fashion also for a plurality of objects which are situated at different distances. For objects which are located further apart, the required depth of field is achieved with a greater f-stop. With objects which are located relatively close to each other, or for a single object, a smaller f-stop can permit better exposure.

A camera according to the invention has a computer unit, which is adapted, in particular in program-technical terms, to carry out a method according to the invention.

The implementation of the method in the form of software is also advantageous, since this incurs particularly low costs, in particular if an executing control device is also used for other tasks and is therefore already present. Suitable data carriers for providing the computer program are in particular discs, hard drives, flash memory, EEPROMs, CD-ROMs, DVDs and more. A program can also be downloaded via computer networks (Internet, intranet etc.).

Further advantages and embodiments of the invention result from the description and the accompanying drawing.

Is is to be understood that the above-mentioned features and the features which are still to be explained below can be used not only in the respectively stated combination, but also in other combinations or alone, without departing from the scope of the present invention.

BRIEF DESCRIPTION OF THE DRAWINGS

The invention is illustrated schematically on the basis of an exemplary embodiment in the drawing and will be explained in detail with reference to the drawing.

DETAILED DESCRIPTION

Figure 1:
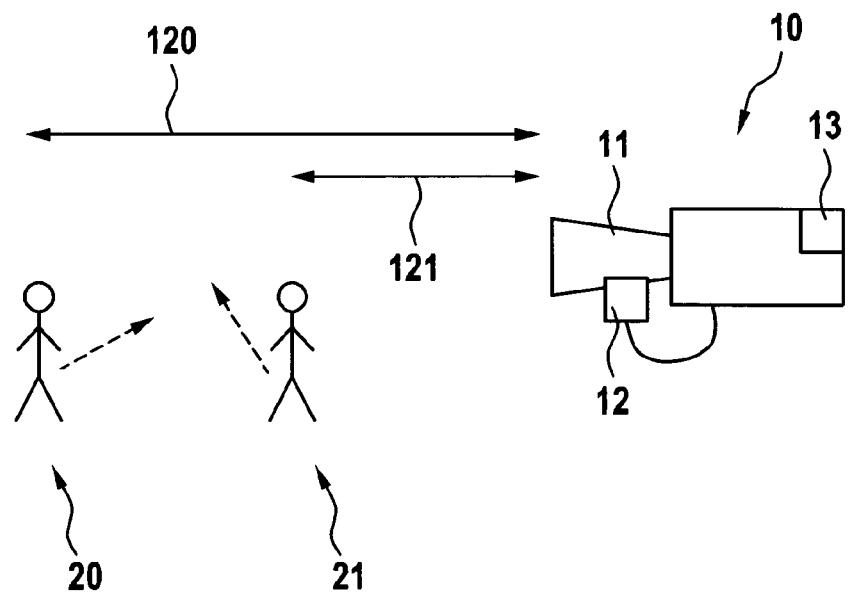
FIG. 1 schematically illustrates a camera for a method according to the invention in one preferred embodiment and two objects to be monitored.

FIG. 1 schematically illustrates a camera 10, for example a smart camera for video monitoring, having an optical unit 11 and a driveable actuator unit 12. The optical unit serves for focusing, while the actuator unit 12 is designed for automatic adjustment of the optical unit 11. The camera 10 furthermore comprises a stop, the aperture of which can likewise be changed using the actuator unit 12.

Further illustrated are two objects, in the form of persons 20 and 21, which can be recorded by the camera 10 and can be captured and identified as objects using a suitable image evaluation unit (computer unit) 13.

Persons 20 and 21 are situated at distances 120 and 121, respectively, relative to the camera 10. The image evaluation unit 13 also drives the actuator unit 12.

Figure 2:
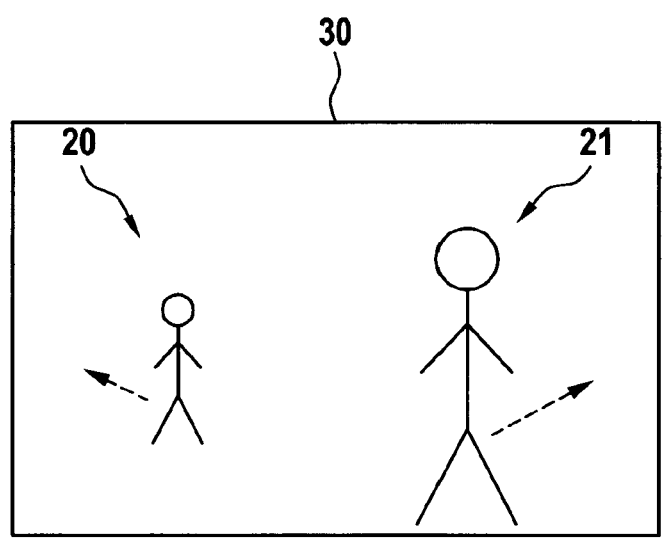
FIG. 2 illustrates schematically two objects to be monitored in a capturing region of a camera for a method according to the invention in one preferred embodiment.

FIG. 2 illustrates persons 20 and 21 in an image region 30 captured by the camera 10 from the view of the camera 10. What can be clearly seen is that person 20, which is located at a greater distance from the camera 10 than person 21, appears smaller than person 21. FIGS. 1 and 2 are described below in an overlapping manner.

The size of persons 20 and 21 can be determined by the image evaluation unit 13 using a suitable algorithm, for example what is known as an IVA algorithm. By way of example, persons 20 and 21 can be classified as persons by the image evaluation unit 13, which yields an average object size of approximately 1.75 m. It is possible on that basis for the distances 120 and 121 of persons 20 and 21 to the camera 10 to be ascertained by the image evaluation unit 13.

The focus can be set on one of the two persons or on both persons, wherein in the latter case the focus is preferably set on the center between the two persons. If the focus is set to both persons, it makes sense to choose the setting of the stop to be such that a necessary depth of field, depending on how the distances 120 and 121 differ, is achieved.

Dotted arrows pointing away from persons 20 and 21 indicate a movement direction of the persons. Movement of the person 20 and/or 21 in the corresponding direction can result in a change of the respective distances 120 and/or 121 of the persons from the camera 10. It should be noted that not every arbitrary movement of a person must also result in a change of the corresponding distance from the camera.

It is possible using the image evaluation unit 13 to deduce a corresponding change in the distances 120 and/or 121 via a change in the size of persons 20 and/or 21 in the capturing region 30. The optical unit 11 can subsequently be adjusted automatically by means of the actuator unit 12 such that the focus of the camera 10 is aimed at the changed distances.

If the intention is to focus on only one person, the change in the stop can initially be neglected. However, if the focus is intended to be on both persons, the difference between the two distances must be taken into consideration and the stop must, if appropriate, be changed accordingly.

Also possible is focusing on more than two objects, although only the maximum and minimum of the distances need be taken into consideration here. The procedure is thus as it is in the case of focusing on two objects.

The invention claimed is:

1. A method for automatically focusing a camera, the camera having an optical unit for focusing and a drivable actuator unit for adjusting the optical unit, on at least three objects, the method comprising:
   recording an image via the camera,
   automatically detecting the at least three objects in the image via image content analysis, automatically performing image content analysis to classify the at least three objects as persons, automatically detecting a direction of movement of the at least three objects,
   automatically determining distances between each of the at least three objects and the camera, and
   driving the drivable actuator unit in a targeted manner based on a minimum distance of the distances, a maximum distance of the distances, and the detected direction of movement of the at least three objects, regardless of other distances other than the minimum distance and the maximum distance of the distances, so that the optical unit is focused on the at least three objects.

2. The method according to claim 1, wherein the at least three objects are assigned, via the image content analysis, to object classes with associated object sizes and wherein the distances are determined on the basis of the associated object sizes.

3. The method according to claim 1, wherein the camera has a stop and the drivable actuator unit for adjusting the stop.

* * * * *